(12) United States Patent
Johnston, VII (10) Patent No.: US 11,220,025 B2
(45) Date of Patent: Jan. 11, 2022

(54) METHODS OF SEPARATING CARBON FIBER TOWS

(71) Applicant: Aerlyte, Inc., Petoskey, MI (US)

(72) Inventor: Christopher Johnston, VII, Petoskey, MI (US)

(73) Assignee: Aerlyte, Inc., Petoskey, MI (US)

( * ) Notice: Subject to any disclaimer, the term of this patent is extended or adjusted under 35 U.S.C. 154(b) by 0 days.

(21) Appl. No.: 17/150,572

(22) Filed: Jan. 15, 2021

(65) Prior Publication Data
US 2021/0129387 A1    May 6, 2021

Related U.S. Application Data (63) Continuation of application No. 16/977,562, filed as application No. PCT/US2019/016280 on Feb. 1, 2019, now abandoned.
(Continued)

(51) Int. Cl.
| | |
|---|---|
| *B29B 15/14* | (2006.01) |
| *B29B 11/16* | (2006.01) |
| *B29B 15/10* | (2006.01) |
| *B29C 65/00* | (2006.01) |
| *D01D 11/02* | (2006.01) |
| *D02J 1/18* | (2006.01) |
| *B65H 51/005* | (2006.01) |

(Continued)

(52) U.S. Cl.
CPC .............. *B29B 15/14* (2013.01); *B29B 11/16* (2013.01); *B29B 15/10* (2013.01); *B29B 15/122* (2013.01); *B29C 66/69* (2013.01); *B65H 51/005* (2013.01); *D01D 11/02* (2013.01); *D01F 9/14* (2013.01); *D02J 1/18* (2013.01); *B29B 15/12* (2013.01); *B29K 2105/08* (2013.01); *B29K 2307/04* (2013.01); *B65H 2701/314* (2013.01); *B65H 2701/38* (2013.01)

(58) Field of Classification Search
CPC ....... B29B 15/14; B29B 15/10; B29B 15/122; B29B 15/12; B29B 11/16; B29C 66/69; D01D 11/02; B29K 2105/08; B29K 2307/04
USPC .......................................................... 28/282
See application file for complete search history.

(56) References Cited

U.S. PATENT DOCUMENTS

| | | |
|---|---|---|
| 2,657,433 A | 11/1953 | Merriman |
| 3,197,351 A | 7/1965 | Selby |

(Continued)

FOREIGN PATENT DOCUMENTS

| | | |
|---|---|---|
| DE | 102011005329 A1 | 9/2012 |
| EP | 2138615 A1 | 12/2009 |

(Continued)

*Primary Examiner* — Jeffrey M Wollschlager
*Assistant Examiner* — Xue H Liu
(74) *Attorney, Agent, or Firm* — Brooks Kushman P.C.

(57) ABSTRACT

A method of separating carbon fiber tows. The method includes separating two or more first carbon fiber tows from a first tow band onto a second elevation to form two or more second carbon fiber tows from a second tow band. The two or more second carbon fiber tows from the second tow band leave gaps next to first adjacent tows of the two or more first carbon fiber tows remaining from the first tow band after the separating step. The first adjacent tows from the first tow band leave gaps next to second adjacent tows of the two or more second carbon fiber tows from the second tow band.

22 Claims, 4 Drawing Sheets

Related U.S. Application Data (60) Provisional application No. 62/639,409, filed on Mar. 6, 2018.

(51) Int. Cl.
*B29B 15/12* (2006.01)
*D01F 9/14* (2006.01)
*B29K 307/04* (2006.01)
*B29K 105/08* (2006.01)

(56) References Cited

U.S. PATENT DOCUMENTS

| | | | |
|---|---|---|---|
| 3,286,307 | A | 11/1966 | Watson |
| 3,384,932 | A | 5/1968 | Watson, Jr. |
| 3,795,944 | A | 3/1974 | Daniels |
| 3,873,389 | A | 3/1975 | Daniels |
| 4,269,024 | A | 5/1981 | Ashpole et al. |
| 4,421,584 | A | 12/1983 | Kitagawa et al. |
| 5,001,172 | A | 3/1991 | Tsuchiya et al. |
| 5,042,122 | A | 8/1991 | Iyer et al. |
| 5,060,351 | A | 10/1991 | Street |
| 5,182,839 | A | 2/1993 | Stuart |
| 5,205,898 | A | 4/1993 | Wilson et al. |
| 5,241,731 | A | 9/1993 | Stuart |
| 5,268,050 | A | 12/1993 | Azari |
| 5,445,701 | A | 8/1995 | Koba et al. |
| 6,032,342 | A | 3/2000 | Kawabe et al. |
| 6,139,956 | A | 10/2000 | Endoh et al. |
| 6,253,431 | B1 | 7/2001 | Ames et al. |
| 6,311,377 | B1 | 11/2001 | Kreuger |
| 6,403,504 | B1 | 6/2002 | McMahon et al. |
| 6,503,856 | B1 | 1/2003 | Broadway et al. |
| 6,543,106 | B1 | 4/2003 | Ames et al. |
| 6,684,468 | B1 | 2/2004 | Lujan |
| 6,743,392 | B2 | 6/2004 | Tanaka et al. |
| 6,836,939 | B2 | 1/2005 | Guirman et al. |
| 7,571,524 | B2 * | 8/2009 | Kawabe |
| 7,832,068 | B2 | 11/2010 | Kawabe et al. |
| 7,910,503 | B2 | 3/2011 | Kreuger et al. |
| 8,062,448 | B2 | 11/2011 | Bompard et al. |
| 8,623,248 | B2 | 1/2014 | Wahal et al. |
| 8,951,924 | B2 | 2/2015 | Kreuger et al. |
| 9,003,619 | B2 | 4/2015 | Kawabe |
| 9,682,515 | B2 | 6/2017 | Beraud et al. |
| 2011/0076441 | A1 | 3/2011 | Gruenert et al. |
| 2013/0113133 | A1 | 5/2013 | Kashikar |
| 2013/0193623 | A1 | 8/2013 | Kashikar |
| 2017/0002154 | A1 | 1/2017 | Hiasa et al. |
| 2018/0111350 | A1 | 4/2018 | Berlin et al. |

FOREIGN PATENT DOCUMENTS

| | | |
|---|---|---|
| GB | 2340136 A | 2/2000 |
| JP | 2003268137 A | 9/2003 |
| WO | 2002031242 A1 | 4/2002 |
| WO | 2005/002819 A2 | 1/2005 |
| WO | 2016/142781 A1 | 9/2016 |

* cited by examiner

METHODS OF SEPARATING CARBON FIBER TOWS

CROSS-REFERENCE TO RELATED APPLICATIONS

This application is a Continuation of U.S. application Ser. No. 16/977,562, now abandoned, filed Sep. 2, 2020, which is the U.S. National Phase of PCT Application No. PCT/US2019/016280 filed on Feb. 1, 2019, which claims the benefit of U.S. provisional application Ser. No. 62/639,409 filed Mar. 6, 2018, the disclosures of which are hereby incorporated in their entirety by reference herein.

TECHNICAL FIELD

The present disclosure relates to methods of separating carbon fiber tows.

BACKGROUND

Fiber-reinforced composites may generally include a resin and a reinforcing fiber. In many cases, the resin and the reinforcing fiber have different properties, such that when these components are combined, the resulting fiber-reinforced composite has properties intermediate the resin and the reinforcing fiber. For example, the resin may be relatively low strength but may have relatively high elongation properties, while the reinforcing fiber may be relatively high strength but may be relatively brittle. A part derived from a composite material may have a strength that is greater than the resin while also being relatively tough compared to the reinforcing fiber.

SUMMARY

In one embodiment, a method of separating carbon fiber tows is disclosed. The method includes separating two or more first carbon fiber tows from a first tow band onto a second elevation to form two or more second carbon fiber tows from a second tow band. The two or more second carbon fiber tows from the second tow band leave gaps next to first adjacent tows of the two or more first carbon fiber tows remaining from the first tow band after the separating step. The first adjacent tows from the first tow band leave gaps next to second adjacent tows of the two or more second carbon fiber tows from the second tow band.

The separating step may be performed in-line with a carbon fiber carbonization process. The separating step reduces the filament density of one or both of the first and second tow bands by at least 50%. The filament density of one or both of the first and second tow bands may be less than or equal to 1000 filaments/mm.

The method may further include spreading one or both of the first and second tow bands to eliminate one or more of the gaps between the tows of the one or both of the first and second tow bands. The one or both of the first and second tow bands are stabilized and/or spooled after the separating step. The one or both of the first and second tow bands are impregnated with a resin after the separating step. The two or more first carbon fiber tows from the first tow band are from a first elevation. The method may further include subjecting the first tow band to a surface treatment in-line with the separating step. The method may further include subjecting the first tow band to a sizing agent in-line with the separating step. The method may also including providing the first tow band from a furnace of a carbon fiber line.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The term "about" may be used herein to describe disclosed or claimed embodiments. The term "about" may modify a value disclosed or claimed in the present disclosure. In such instances, "about" may signify that the value it modifies is within ±0%, 0.1%, 0.5%, 1%, 2%, 3%, 4%, 5% or 10% of the value.

Among reinforcing fibers, the specific strength and stiffness of carbon fiber is among the highest. For example, compared to E-glass, a widely used industrial fiber, the specific strength of carbon fiber can be more than twice as high while the specific modulus can be over four times higher. For industries where fuel economy, performance, and/or greenhouse gas emissions are highly relevant (e.g., aerospace and automotive industries), carbon fibers composites (i.e., fiber-reinforced composites made from carbon fiber) may be particularly beneficial. However, the cost of converting carbon fiber into a part remains high and presents a hurdle to the use of carbon fiber composites. Consequently, process refinements to improve efficiency, eliminate waste, and/or reduce cost may expand the value and market for carbon fiber composites.

Carbon fiber may be used in a prepreg (an example of a fiber-reinforced composite) in the production of parts. The carbon fiber, typically in a continuous format such as unidirectional fibers, woven tows, or stitched plies of unidirectional fibers, and the resin are pre-impregnated to form the prepreg in which the resin substantially impregnates the fibers and forms an intermediate material. The prepreg may be placed into a mold to produce a part. Impregnation may refer to a process in which the resin and fiber are subjected to conditions that promote the wet-through of the resin into the mass of the fibers and wets out the individual filaments. This wet-out may refer to the resin coming into close enough contact with the filaments of the fiber so that the resin mechanically couples to the surface features of the individual filaments and chemically couples to the molecular structure of the filaments. Strong coupling between the resin and the filament may provide optimum fiber-reinforced composite properties for structural applications.

Carbon fiber may be spread into a thin layer of filaments to reduce the depth of filaments through which the resin passes to reach each filament. This spreading process may include drawing fiber from bobbins in-line with the impregnation process. However, spreading of the carbon fiber in-line with the impregnation process may introduce additional conversion costs for converting carbon fiber to produce a prepreg.

Carbon fiber may be produced as a relatively wide but thin band of filaments from a starting material of multiple strands of precursor fiber that are spread flat to form a tow band. A tow band may range from about 1,000 filaments or less for a scientific line, up to about 100 mm for a microline, about 300 to 1,000 mm for a pilot line, and about 1 m to 5 m or 6 m or higher for a commercial production line. Each strand of precursor fiber may consist of a specified filament count, which may be referred to as the tow size. The tow size may range from about 3K or lower to about 60K or higher, where K=1,000. Non-limiting examples of specific sizes include about 1K, 3K, 6K, 12K, 15K, 24K and 50K. Assuming 50K tows are spaced every about 20 mm in width, then the filament density would be about 2,500 filaments/mm. The filament density may be higher or lower for other configurations, filament diameters and tow sizes. For example, filament densities of about 3,500 filament/mm or more may be desired to increase line capacity.

The precursor fibers typically undergo a multi-step conversion process whereby the fiber is initially stretched to orient its molecular structure followed by a stabilization (thermosetting) process where the fiber is exposed to air at elevated temperatures. The stabilized fiber is then subjected to a series of elevated temperatures within an inert environment along a series of furnaces. This step is known as carbonization. Upon exiting the furnace, the resulting carbon fiber may undergo a surface treatment followed by the application of a sizing agent. After these steps are performed, the carbon fiber is typically wound into a cylindrical package or bobbin, wrapped in film, and packaged in boxes for shipment.

The surface treatment modifies the physical and/or chemical nature of the filaments of the carbon fiber exiting the furnace to improve the mechanical and/or chemical coupling of the carbon fiber with the resin. The surface treatment may change the physical surface of the fiber, such as etching the surface to promote mechanical coupling between the filaments and the resin. The surface treatment may also increase the number of chemically reactive sites on the surface of each filament to facilitate chemical coupling with the resin. The surface treatment may also improve wetting (e.g., impregnation or wet-out or coverage) of the filaments by the resin. The surface treatment may deliver one or more of these effects.

Sizing agents are typically complex chemical mixtures applied to filaments that contain a variety of constituents, for example, film formers, coupling agents, resins, and/or other compounds. Sizing agents may be typically applied as a dispersion or solution using an organic solvent or as an aqueous based solution or dispersion. Non-limiting functions of a sizing agent include (1) protecting filaments from abrasion during subsequent handling, such as weaving, (2) control of static electricity, and (3) promoting chemical coupling between the filaments and resin applied during subsequent processing. Sizing differs from matrix resin in that a major function of a matrix resin is to facilitate the transfer of load between the fibers and to protect the fiber from external forces or environmental damage. Moreover, a matrix resin may exhibit a higher strain to failure than the carbon fiber and may contribute to the toughness of the composite material. Once dried, the sizing tends to weakly hold the individual filaments together.

Methods that utilize carbon fiber (e.g., as continuous fibers or fibers pre-impregnated with resin) typically include a process to spread carbon fiber tows coming from a bobbin. The spreading process serves one or more functions. First, the individual filaments may be separated from each other if a sizing agent has been applied to facilitate impregnation or surrounding each filament with resin. The sizing may inhibit the ability of the resin to surround individual filaments because sizing may hold the filaments together. Second, the spreading process may modify the profile of the tow to a thinner and wider band of filaments to increase surface area or expose more filaments to the resin being applied to facilitate impregnation of the individual filaments.

The spreading process may have one or more drawbacks. Spreading is often done under tension using a series of spreader bars. The bars may be heated, stationary, rotating, vibrating, or use a combination of these approaches. The bars may be staggered causing the tows to partially wrap around each bar and drag across the surface. This may cause increased tension over each successive bar. The interaction between the tows and bars under tension to separate the filaments to overcome the effects of the sizing can damage the filaments causing breakage or microcracks weakening the filaments when stressed as a composite material or part. The spreading process may also add complexity and cost to the process of converting the carbon fiber tows into intermediate formats. The spreading process may be rate limiting, thereby adding a bottleneck to the process. Such bottleneck may contribute to higher manufacturing costs for downstream processes, such as impregnation.

Another method of spreading utilizes a stream of air applied across the tows to influence a spreading behavior. Such a technique may reduce the damage experienced by mechanical manipulation of the fiber, but adds complexity and expense to the process, and limits the speed of downstream processes.

Considering one or more of these drawbacks, one or more embodiments are proposed. The proposed processes separate the spreading of the tow from the impregnation step and places the production of the spread tow and its stabilization for subsequent use upstream with the commercial production of the carbon fiber, thereby reducing the conversion cost of producing the fiber-reinforced composite (e.g., prepreg or filament winding). In one or more embodiments, a process includes a first step of converting carbon fiber tow into a semi-finished tape in-line with the commercial production of the carbon fiber and a second step of impregnating the semi-finished tape with a matrix resin offline from the commercial production of the carbon fiber.

Production of a semi-finished tape in accordance with one or more embodiments can be accomplished in various ways. Carbon fiber tow, such as about 3K, 6K, 12K, 24K, and 50K carbon fiber tow, may be used to be directly stabilized into a semi-finished tape. The carbon fiber tow may be spread further in-line with the carbon fiber production process into a desired tape format or structure before being stabilized to eliminate gaps between the tows or to reduce the filament density to a level suitable for the impregnation process without the need for additional spreading.

For example, 50K carbon fiber tows may be produced at a filament density of 2,500 filaments/mm and the impregnation process may require a filament density of around 833 filaments/mm necessitating additional spreading of the tows before stabilization. In one embodiment, the carbon fiber tows may be separated onto three different elevations. The differently elevated tows may be spread from a first width (e.g., 20 mm) to a second width (e.g., 60 mm) to produce a uniform tape or sheet format. By utilizing this method, the horizontal alignment of the tow centerlines remains unaltered minimizing the disruption of tension across the fiber through the fiber production process. Each set of tows can be spread and combined at a different elevation so that three tape structures can be produced at the same time. For less spreading, every other tow may be separated and two tape structures produced simultaneously. For more spreading, every fourth or fifth tow may be separated and a corresponding number of tape structures produced at the same time. In one embodiment, only one tape structure may be produced from the selected tows and those not utilized can be processed under normal conditions and packaged into bobbins.

One or more methods can be used to stabilize the carbon fiber. One method is to utilize a stabilizing material such as a sizing agent in sufficient concentration so that when the sizing is dried it retains the fiber in a tape format and facilitates winding onto and unwinding from a spool. Alternatively, it may be advantageous to eliminate or minimize the amount of sizing applied. In such a case, the stabilizing material could be a resin such as a binder applied to the fiber. The application of the binder (an example of a stabilizing resin) may coincide with the application of the sizing agent or could be applied separately. If a thermoset binder is utilized, then curing, partial curing, or melting and cooling of the binder after application stabilizes the fiber in the format of the semi-finished tape. If a thermoplastic binder is used as the stabilizing agent, then then the binder may be melted and cooled to stabilize the fiber into the format of a semi-finished tape. This thermoplastic binder could become a portion of all the matrix resin that impregnates the filaments during the impregnation step or the binder could constitute all of the matrix resin following the impregnation step.

Alternatively, or in addition to the sizing and/or binder, a separate application of a stabilizing resin in a suitable format can be combined with the carbon fiber thereby stabilizing and/or protecting the fiber for spooling and unspooling. The stabilizing resin could be similar to the binder in composition and physical properties or different from the binder. In the case of a thermoplastic binder, the binder may have a different melting point from the resin. The stabilizing resin may be applied to one or both sides of the carbon fiber. This stabilizing resin can become a portion of or all of the matrix resin that impregnates the filaments during the impregnation step. The stabilizing resin, for example, could be in the format of a nonwoven fabric or film and may simply act as a divider in the first step to facilitate spooling or winding onto a core so that adjacent layers of the thinly spaced fibers do not interact with each other and the semi-finished tape can be unwound without damage for subsequent processing. During the impregnation step, this nonwoven fabric or film would become part or all of the matrix resin. Another possibility to stabilize the fiber includes the use of an impregnating agent possibly containing a microcrystalline wax with a lower melting point than the resin and low viscosity to easily permeate the filaments when melted and adhere to both the stabilizing resin, such as a nonwoven, and filaments when cooled.

If a sizing agent has been applied to the fiber, the concentration of the sizing is typically less than 10% weight fraction of the fiber and more typically less than about 5% and usually less than about 3%. If a stabilizing resin is utilized in the production of the semi-finished tape that through subsequent impregnation becomes some or all the matrix resin of the composite material it can be applied at a concentration up to about 80% volume fraction based upon the fully impregnated prepreg or between about 40% and 60% volume fraction based upon the fully impregnated prepreg. Resin volume fraction based upon fully impregnated prepreg is a theoretical calculation of the percentage of resin volume to total volume of the composite material which includes the volume represented by the fiber but excluding any voids (spaces occupied by air).

If a stabilizing resin is utilized in the production of a semi-finished tape, it can be converted in a separate or offsite process into a format suitable for bringing it into proximity with the carbon fiber. The resin can be a thermoplastic or thermoset resin or a combination of the two and may include additives, fillers, or other compounds that contribute the desired attributes required for subsequent processing and/or use in the intended application. Such formats may include powders, suspensions, solutions, continuous tows or yarns formed from filaments produced from the resin, nonwoven mats derived from said filaments or as a spunbond, or textile type fabrics produced from weaving or stitching together said filaments or yarns. Another format may include of one or more films produced from the resin, or a combination of formats could be applied.

Once the carbon fiber has been stabilized as a semi-finished tape, the semi-finished tape is packaged for transportation to and for use in a subsequent impregnation process. The packaging of the semi-finished tape may be in the form of a spool onto which the semi-finished tape is wound. If the semi-finished tape is in the format of a single spread tow, then the packaging could be in the format of a bobbin. If necessary, the packaging can include a protective layer of film or a bag that surrounds the spool or package or bobbin and forms a barrier to moisture or other contaminants that may adversely affect the resin or fiber or its suitability for subsequent processing.

In the second step, the semi-finished tape undergoes impregnation by subjecting it to conditions suitable for penetrating the fiber with a matrix resin and impregnating or surrounding the desired portion of filaments with said resin. If the semi-finished tape is prepared without sufficient stabilizing resin to produce the targeted fiber concentration for the prepreg or finished part, then additional matrix resin in a suitable format and formulation can be applied. If a thermoplastic prepreg is being produced, these formats may include powders, nonwovens, solutions, suspensions, films, and melt streams of molten resin. If a thermoset prepreg is being produced, the formats may include powders, films, liquids, solutions, suspensions, and pastes.

The second step may utilize steps associated with the production of prepreg, such as melt impregnation where molten polymer is applied to the fiber, solution coating where a polymer is dissolved in a solvent through which the fiber is drawn, slurry coating where polymer particles are suspended in a solution through which the fiber is drawn, film stacking where adjacent layers of un-melted polymer are initially applied, filament winding where fiber is drawn through a resin bath, powder impregnation where dry particles of a resin are directly applied to the fiber, or other suitable impregnation processes.

In one or more embodiments, a process includes a first step of converting a carbon fiber into a semi-finished tape in-line with the commercial production of the carbon fiber and a second step of impregnating the semi-finished tape with matrix resin offline from the production of the carbon fiber. This process has several advantages over a process in which the carbon fiber is spread in-line with the impregnation process.

First, the production of carbon fiber is done at a relatively slow speed facilitating the addition of the conversion of the carbon fiber into a semi-finished tape in-line. Typical line speeds to produce carbon fiber are in the range of about 6 to 12 m/min. Various spreading technologies have similar processing speeds. The processing speeds for stabilizing carbon fiber into a tape format are also typically within this range. The stabilizing step adds relatively minor complexity and investment, and therefore, only minor costs are added by such integration.

Second, the issue of spreading the tow is reduced since the filaments coming from the production process are loosely aligned but remain independent of adjacent filaments, thereby permitting easy spreading if necessary depending upon the filament density targeted by the impregnation process. Alternatively, if the filament density is satisfactorily coming off the production process, then the fiber can be stabilized directly into a tape format without the need for additional spreading.

Third, the possibility exists to bypass the application of a sizing agent if an un-sized format is utilized. For certain matrix resins, an un-sized fiber may offer performance advantages as the un-sized fiber couples better to the resin than a fiber with a sizing agent. For example, a surface treatment applied to a carbon fiber may be very effective in promoting coupling between carbon fiber filaments and the matrix resin. However, due to handling issues associated with the utilization of carbon fiber post-production in traditional processes such as weaving, an economical throughput often requires sizing. While sizing may promote coupling and facilitate handling, it sometimes reduces performance compared to un-sized but surface treated fiber. As another benefit, eliminating the use of sizing eliminates the associated costs. Alternatively, if sizing is warranted, converting the fiber into a semi-finished tape in-line with the production of the fiber and application of the sizing agent enables the fiber to be retained in a preferential tape format or filament density as the sizing dries. Certain spreading techniques, such as an ultrasonic process in an aqueous based solution or other solution, may be compatible with the sizing process and/or surface treatment. Binders may be incorporated with the sizing to stabilize the format of carbon fiber into a tape or sheet.

The process of impregnation brings the matrix resin into direct contact with and ideally surrounds each filament and promotes coupling of the two components. The coupling correlates to desirable properties of the resulting composite material. However, the impregnation process may be expensive and complex. Such complexity may not be supported by attempting to impregnate in-line with the production of the carbon fiber. Such impregnation may be better conducted off-line of the carbon fiber production process in a subsequent process step.

In the case of producing a prepreg, an intermediate material in which the filaments are substantially impregnated before being converted into a part, process parameters such as fiber tension, fiber temperature, resin temperature, applied pressure or shear, time at temperature and pressure, cooling time, and other process variables may require precise control. The equipment necessary to achieve such control can represent a substantial investment and therefore may be designed to operate at speeds (meters/minute or feet/minute) higher than what can be achieved in the production of the carbon fiber to minimize amortized cost. For example, speeds more than about 12 m/min may be desired. In addition, such prepreg lines typically occupy significant space that would be difficult to accommodate in-line at most existing carbon fiber plants or without significant additional investment. Also, the complexity of operating such a system in-line with the production of the carbon fiber may impede precise and consistent control of the carbon fiber production process and resultant product characteristics and risk increased scrap, waste, and/or downtime. For example, precise control of tension during the process of producing carbon fiber is critical to establishing consistent mechanical properties of the fiber. Precise control over tension may be compromised or the optimum tension for the production of the carbon fiber may be different from the optimum tension for impregnating the fiber.

In one or more embodiments, conversion of the carbon fiber into a semi-finished tape in-line with the carbon fiber production process and completion of the impregnation of the semi-finished tape off-line in a separate process under the controls and throughputs relevant to the impregnation process is disclosed. One benefit of the semi-finished tape is that the raw materials may be prepositioned into an optimum configuration to facilitate impregnation allowing impregnation to take place more economically and without undue stress on the fiber. Under such a scenario, impregnation can happen in a variety of methods that apply heat and pressure and shear to wet-out the individual filaments with resin. Heating can be from a variety of mechanisms such as infrared, convection, conduction, electromagnetic such as microwaves or other sources or combinations of methods and may heat the fiber or the resin which then conducts heat to the other or heats both the resin and fiber at the same time. Pressure and shear can also be applied in a variety of methods such as with nip rollers, double belt presses, kneading rollers, impregnation rollers across which the tape is drawn under tension, twisting of the tape, vibration such as ultrasonics, and other means.

While a tow band may include a plurality of tows, any number of the tows can be converted into the semi-finished tape. If all the tows are not utilized, then the others can be processed in the traditional means and packaged for example as bobbins of dry or sized fiber. When only one or two or a few of the tows are utilized to produce the semi-finished tape, the result is a narrow tape. If a substantial number of tows or all the tows are utilized then the result is a wide tape or sheet. The tapes or sheets may be packaged directly or subdivided by slitting or other means prior to packaging. The width of the semi-finished tape can range from a few millimeters to as high as several meters depending upon the number of tows utilized and the width of the tow band.

Figure 1:
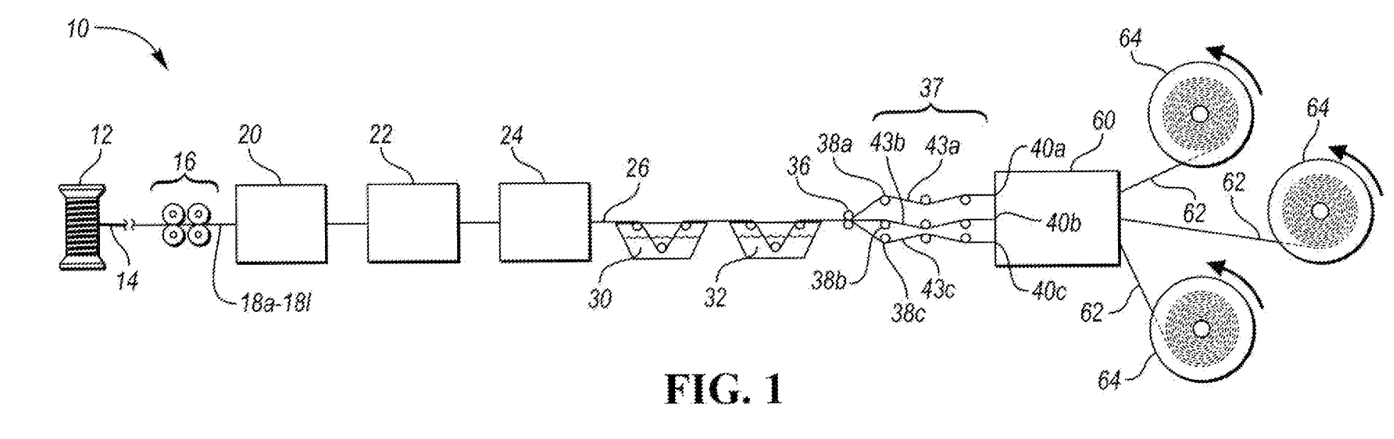
FIG. 1 depicts a schematic, side view of a carbon fiber production process according to a first embodiment.
Figure 2:
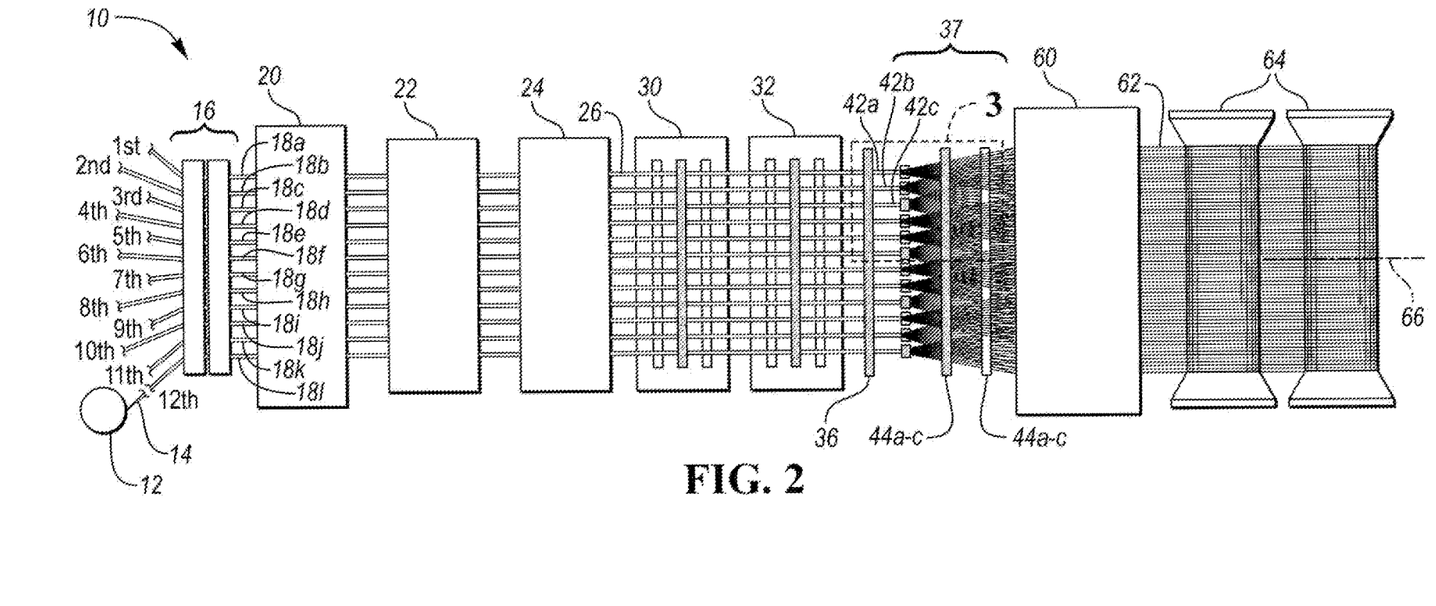
FIG. 2 depicts a schematic, top view of a carbon fiber production process according to the first embodiment.
Figure 3:
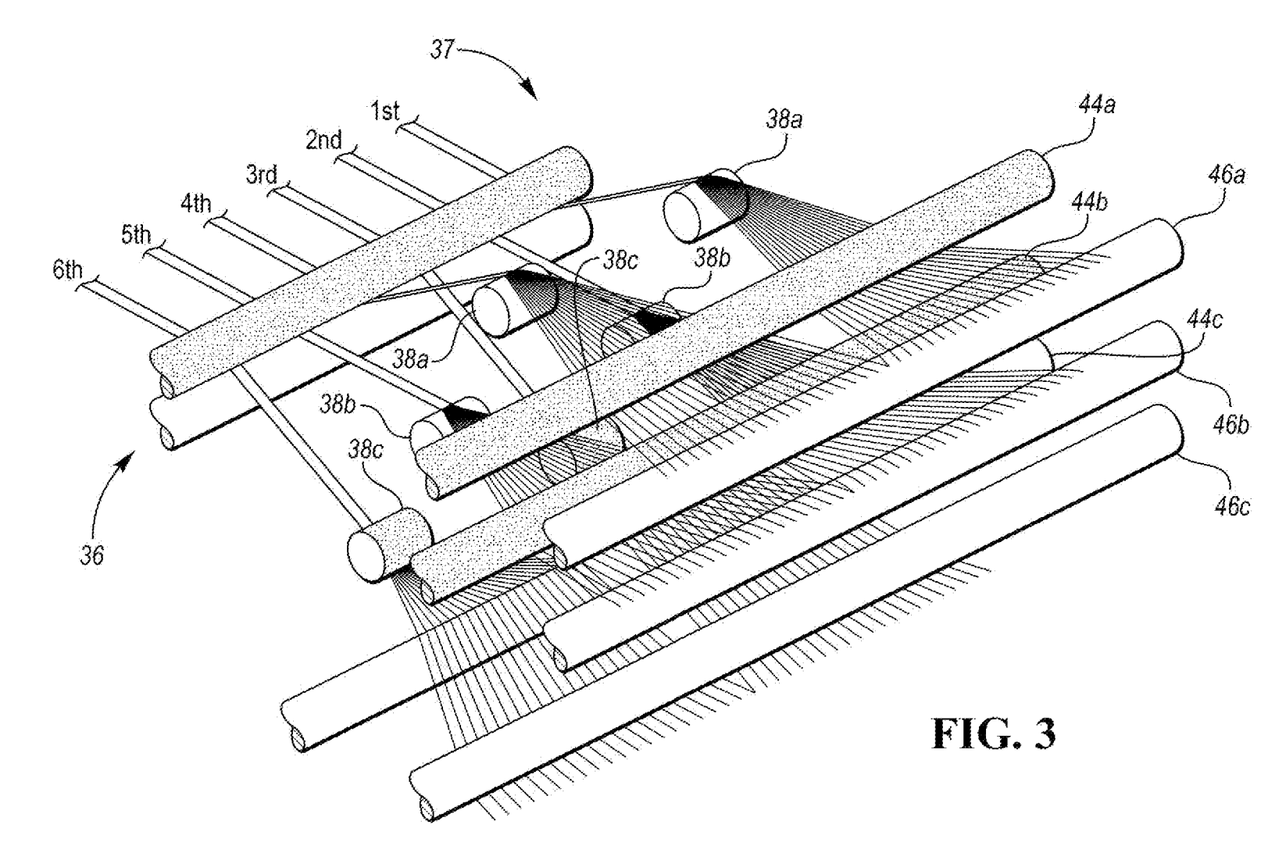
FIG. 3 depicts a schematic, fragmented, perspective view of a carbon fiber elevation separation step according to the first embodiment.
Figure 4:
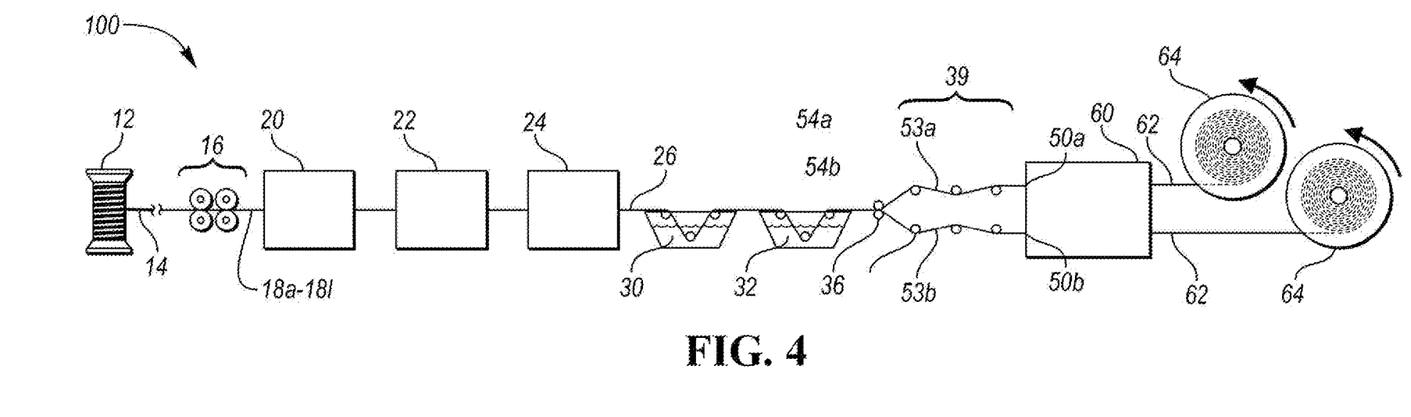
FIG. 4 depicts a schematic, side view of a carbon fiber production process according to a second embodiment.
Figure 5:
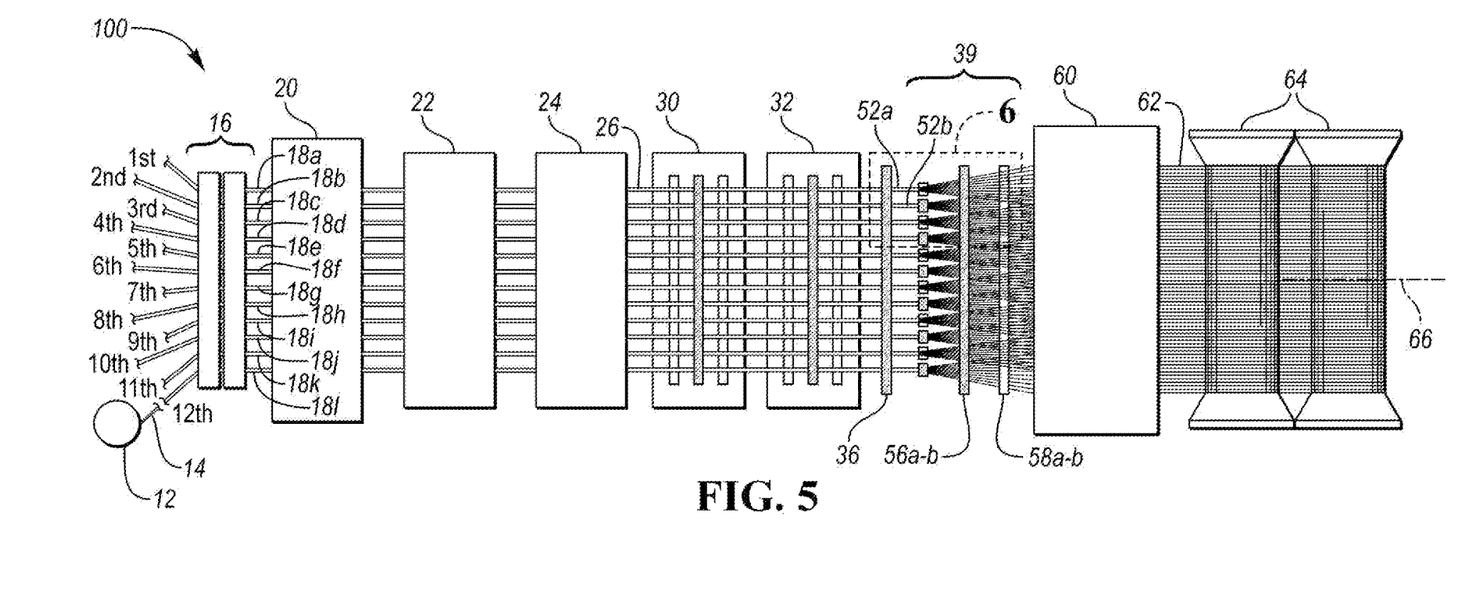
FIG. 5 depicts a schematic, top view of a carbon fiber production process according to the second embodiment.
Figure 6:
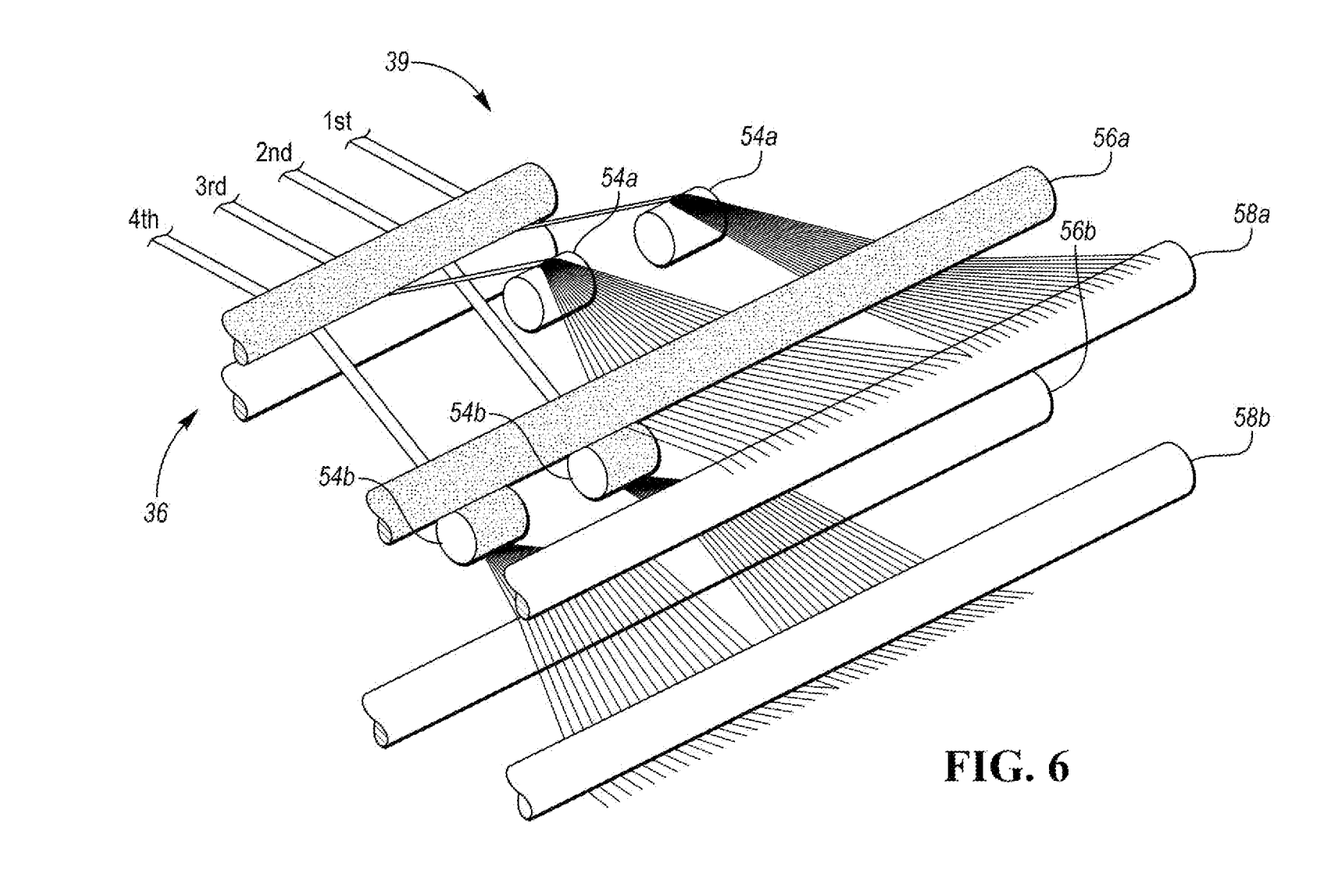
FIG. 6 depicts a schematic, fragmented, perspective view of a carbon fiber elevation separation step according to the second embodiment.

FIGS. 1-6 describe embodiments of a carbon fiber production process including a stabilization step. FIGS. 1-3 disclose a carbon fiber production process according to a first embodiment. FIGS. 4-6 disclose a carbon fiber production process according to a second embodiment. Carbon fiber production process 10 of FIGS. 1-3 and carbon fiber production process 100 of FIGS. 4-6 share common process steps. Each process 10 and 100 begins with the unspooling of a precursor material, such as polyacrylonitrile (PAN), as shown by spool 12. The precursor fiber 14 is fed into a stretching device 16 to orientate the molecular structure of the precursor material. The precursor fibers are oriented into a tow band and subjected to a thermosetting step 20, and subsequently a carbonization step 22 and a graphitization step 24.

As schematically shown in the Figures, there are twelve (12) tows 18a-18l forming a tow band 26. Each tow may have a tow size, for example about 1K, 3K, 6K, 12K, 15K, 24K and 50K. The total width 28 of the tow band 26 may be about 1 m to 6 m, or about 0.25 m increments therebetween. In one example, if there are 100 50K carbon fiber tows within a tow band and each tow is spaced 20 mm, the total width of the tow band may be about 2 m.

As shown in the Figures, tow band 26 is first subjected to a surface treatment 30 and then subsequently subjected to a sizing agent 32. The treated and sized tow band is fed between rollers or stationary bars 36. The surface treatment 30 includes drawing the tow band 26 into and out of a bath with a surface treatment material. The sizing 32 includes drawing the tow band 26 into and out of a bath of sizing agent. As shown in the Figures, the drawing of the tow band 26 through the baths include the tow bands contacting a number of touch points. Arrangement of these touch points into different elevations similar to those of the spreading zones 37 and 39 can be used to spread the carbon fiber tows in place of the spreading zones 37 and 39 or in addition to the spreading zones 37 and 39.

The output from the rollers or stationary bars 36 is spaced vertically in spreading zone 37 or 39. With respect to FIGS. 1-3, rollers 38a, 38b and 38c place each carbon tow from the tow band 26 on a first, second or third elevation 40a, 40b and 40c, respectively. As shown in FIGS. 1-3, the first carbon fiber tow 42a is placed on the first, highest elevation 40a, the second carbon fiber tow 42b is placed on the second, middle elevation 40b, and the third carbon fiber tow 42c is placed on the third, lowest elevation 40c. This separation sequence can be repeated for each successive carbon tow. As shown in FIGS. 1-3, the $1^{st}$, $4^{th}$, $7^{th}$ and $10^{th}$ carbon fiber tows are placed on the first, highest elevation 40a, the $2^{nd}$, $5^{th}$, $8^{th}$ and $11^{th}$ carbon fiber tows are placed on the second, middle elevation 40b, and the $3^{rd}$, $6^{th}$, $9^{th}$ and $12^{th}$ carbon fiber tows are placed on the third, lowest elevation 40c. While separating adjacent carbon fiber tows is shown in FIGS. 1-3, non-adjacent carbon fiber tows may be placed on different elevations. Separated carbon fiber tows 43a-c are spread onto spreaders 44a-c and 46a-c, respectively, to fill the gaps created between the individual tows being placed at different elevations, while maintaining the same or about the same parallelism to the horizontal machine centerline 66. In the embodiment shown in FIGS. 1-3, the filament density may be reduced by $\frac{2}{3}^{rd}$ the filament density of the carbon fiber tows entering the rollers or stationary bars 36.

Another embodiment is shown in FIGS. 4-6. In FIGS. 4-6, the filament density may be reduced by a half by using every other tow and placing the carbon fiber tows on first and second elevations 50a and 50b. As shown in FIGS. 4-6, the first carbon fiber tow 52a is placed on the first, high elevation 50a, and the second carbon fiber tow 52b is placed on the second, low elevation 50b by using rollers 54a and 54b, respectively. This separation sequence can be repeated for each successive carbon tow. As shown in FIGS. 4-6, the $1^{st}$, $3^{rd}$, $5^{th}$, $7^{th}$, $9^{th}$ and $11^{th}$ carbon fiber tows are placed on the first, high elevation 50a, and the $2^{nd}$, $4^{th}$, $6^{th}$, $8^{th}$, $10^{th}$ and $12^{th}$ carbon fiber tows are placed on the second, low elevation 50b. While separating adjacent carbon fiber tows is shown in FIGS. 4-6, non-adjacent carbon fiber tows may be placed on different elevations. Separated carbon fiber tows 53a and 53b are spread onto spreaders 56a and 56b and 58a and 58b, respectively, to fill gaps created between the individual tows being placed at different elevations, while maintaining the same or about the same parallelism to the horizontal machine centerline 66.

Separated and spread carbon fiber tows are stabilized with a stabilizing resin or stabilizing material as shown in box 60 to produce a semi-finished tape 62. The stabilizing resin or stabilizing material may be the same material or a different material as the matrix resin used to impregnate the semi-finished tape. The stabilizing resin may include one or more binders, one or more impregnating agents, or a combination thereof. The stabilizing resin may include one or more additives, one or more fillers or combinations thereof. The stabilizing resin may be introduced in a format of a powder, a suspension, a solution, a yarn, a nonwoven mat, a textile fabric, a film, or combinations thereof during the stabilizing step. The stabilizing material may be one or more resins or one or more sizing agents.

The semi-finished tape 62 may be wound onto one or more windings 64. In one or more embodiments, the carbon production process ends upon the semi-finished tape 62 being wound, and the impregnation process begins upon unwinding the wound semi-finished tape 62. The unwound semi-finished tape is then impregnated with a matrix resin in a process offline of the carbon fiber production process.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method comprising:
   separating two or more first carbon fiber tows from a first tow band onto a second elevation to form two or more second carbon fiber tows from a second tow band, the two or more second carbon fiber tows from the second tow band leave gaps between first adjacent tows of the two or more first carbon fiber tows remaining from the first tow band after the separating step, the first adjacent tows from the first tow band leave gaps between second adjacent tows of the two or more second carbon fiber tows from the second tow band.

2. The method of claim 1, wherein the separating step reduces a linear filament density of one or both the first and second tow bands by at least 50%.

3. The method of claim 1, wherein a linear filament density of one or both of the first and second tow bands is less than or equal to 1000 filaments/mm.

4. The method of claim 1 further comprising spreading the tows of one or both of the first and second tow bands to eliminate one or more of the gaps between the tows of the one or both of the first and second tow bands.

5. The method of claim 4, wherein one or both of the first and second tow bands are stabilized and/or spooled after the separating step.

6. The method of claim 4, wherein one or both of the first and second tow bands are impregnated with a resin after the separating step.

7. The method of claim 1, further comprising subjecting the first tow band to a surface treatment in-line with the separating step.

8. The method of claim 1, further comprising subjecting the first tow band to a sizing agent in-line with the separating step.

9. The method of claim 1, further comprising providing the first tow band from a furnace of a carbon fiber line, the providing step is performed in-line with the separating step.

10. The method of claim 1, wherein the separating step reduces a linear filament density of one or both the first and second tow bands.

11. The method of claim 1, wherein a spacing of the tows of the second tow band is greater than a spacing of the tows of the first tow band before the separating step.

12. A method comprising:
separating two or more first carbon fiber tows from a first tow band onto a second elevation to form two or more second carbon fiber tows from a second tow band,
after the separating step, the two or more second carbon fiber tows from the second tow band leave gaps between first tows previously adjacent the two or more second carbon fiber tows,
after the separating step, the first tows previously adjacent the two or more second carbon fiber tows from the second tow band leave gaps between the two or more second carbon fiber tows.

13. The method of claim 12, wherein the separating step reduces a linear filament density of one or both the first and second tow bands by at least 50%.

14. The method of claim 12, wherein a linear filament density of one or both of the first and second tow bands is less than or equal to 1000 filaments/mm.

15. The method of claim 12 further comprising spreading the tows of one or both of the first and second tow bands to eliminate one or more of the gaps between the tows of the one or both of the first and second tow bands.

16. The method of claim 15, wherein one or both of the first and second tow bands are stabilized and/or spooled after the separating step.

17. The method of claim 15, wherein one or both of the first and second tow bands are impregnated with a resin after the separating step.

18. The method of claim 12, further comprising subjecting the first tow band to a surface treatment in-line with the separating step.

19. The method of claim 12, further comprising subjecting the first tow band to a sizing agent in-line with the separating step.

20. The method of claim 12, further comprising providing the first tow band from a furnace of a carbon fiber line, the providing step is performed in-line with the separating step.

21. The method of claim 12, wherein the separating step reduces a linear filament density of one or both the first and second tow bands.

22. The method of claim 12, wherein a spacing of the tows of the second tow band is greater than a spacing of the tows of the first tow band before the separating step.

* * * * *